United States Patent
Dorr et al.

(10) Patent No.: US 7,188,202 B1
(45) Date of Patent: Mar. 6, 2007

(54) TECHNIQUES FOR ACCESSING DEVICES THROUGH A SET OF SERIAL BUSES

(75) Inventors: Timothy E. Dorr, Lancaster, MA (US); Paul H. Maier, Jr., Athol, MA (US); Robert L. Halliday, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 223 days.

(21) Appl. No.: 10/673,305

(22) Filed: Sep. 29, 2003

(51) Int. Cl.
*G06F 1/00* (2006.01)
(52) U.S. Cl. .................. 710/220; 710/316; 710/38; 710/31; 710/15; 710/313
(58) Field of Classification Search ................ 710/220, 710/200, 313–317, 33–38, 107–110, 15–19; 340/825.5, 3.5; 709/249–250
See application file for complete search history.

(56) References Cited

U.S. PATENT DOCUMENTS

| 5,793,307 | A  | * | 8/1998  | Perreault et al. ......... 340/825.5 |
| 6,070,205 | A  | * | 5/2000  | Kato et al. ................. 710/100 |
| 6,114,968 | A  | * | 9/2000  | Ramakrishnan et al. ... 340/3.51 |
| 6,253,269 | B1 | * | 6/2001  | Cranston et al. ............ 710/107 |
| 6,615,161 | B1 | * | 9/2003  | Carney et al. .............. 702/186 |
| 6,629,178 | B1 | * | 9/2003  | Smith ........................ 710/240 |
| 6,640,268 | B1 | * | 10/2003 | Kumar ........................ 710/46 |
| 6,675,243 | B1 | * | 1/2004  | Bastiani et al. ............. 710/105 |
| 6,832,271 | B1 | * | 12/2004 | Ivan et al. ................... 710/15 |
| 6,954,821 | B2 | * | 10/2005 | Fitzsimmons et al. ...... 710/317 |
| 7,039,737 | B1 |   | 5/2006  | Dorr et al. .................. 710/240 |
| 7,068,500 | B1 |   | 6/2006  | Beinor, Jr. et al. ......... 361/685 |
| 7,082,100 | B2 |   | 7/2006  | Linnell et al. .............. 370/217 |
| 2004/0059852 | A1 | * | 3/2004  | Sun et al. ................... 710/110 |
| 2004/0215847 | A1 | * | 10/2004 | Dirstine et al. ............... 710/38 |
| 2006/0143519 | A1 |   | 6/2006  | Maier, Jr. et al. ............. 714/25 |

* cited by examiner

*Primary Examiner*—Mark H. Rinehart
*Assistant Examiner*—Raymond N Phan
(74) *Attorney, Agent, or Firm*—BainwoodHuang

(57) ABSTRACT

In a highly available environmental monitoring system, several slave devices are associated with either a fast polling list or a slow polling list. The fast polling list is polled by a master device more frequently than the slow polling list. A slave device is associated with the fast polling list if the slave device responds to a poll from the master device within a time period, and is associated with the slow polling list if the slave device does not respond to the poll from the master device within the time period. Furthermore, several control devices arbitrate to determine which shall be the master device for controlling several serial buses. The master device periodically switches between the plurality of serial buses to communicate with slave devices.

30 Claims, 10 Drawing Sheets

TECHNIQUES FOR ACCESSING DEVICES THROUGH A SET OF SERIAL BUSES

FIELD OF THE INVENTION

The present invention relates generally to computing systems, and more particularly to a highly available serial bus architecture useful for environmental management and monitoring.

BACKGROUND OF THE INVENTION

Today's networked computing environments are used in businesses for generating, storing, and manipulating large amounts of critical data. For example, banks, insurance companies, and manufacturing companies generate and store critical data related to their business and to their customers. It is therefore very important that the computing systems used for storing the critical data are highly reliable. "High Availability" computing systems employ various means for optimizing reliability.

High Availability systems are generally designed such that single points of failure are avoided in the portions of the system considered "critical". For example, multiple central processing units may provide redundancy, and multiple power supplies ensure protection against the failure of one. However, other parts of the system do not employ high availability mechanisms, primarily because of complexity, expense, and bandwidth conservation requirements.

One area in which it would be advantageous to provide high availability is in the environmental monitoring systems used in computing systems. The environmental monitoring system is used for monitoring and management of various components such as power supplies, temperature controls, fan speeds, voltage and power levels, and the like. The system cannot properly operate unless these functions are monitored and controlled at all times. So, what is needed is an environmental monitoring and management system that employs mechanisms for avoiding single points of failure efficiently and effectively.

SUMMARY OF THE INVENTION

In accordance with one aspect of the invention, a master device polls a plurality of slave devices and maintains a fast polling list and a slow polling list. Each slave device is associated with either the fast polling list or the slow polling list. The fast polling list is polled by the master device more frequently than the slow polling list. A slave device is associated with the fast polling list if the slave device responds to a poll from the master device within a time period, and is associated with the slow polling list if the slave device does not respond to the poll from the master device within the time period.

Furthermore, a slave device on the slow polling list is un-associated with the slow polling list and associated with the fast polling list if the slave device responds to a poll from the master device within the time period. In accordance with one implementation, a slave device on the slow polling list is polled by the master device after all slave devices on the fast polling list have been polled. The master device and the slave devices may be coupled to a serial bus, in which case the master device polls the slave devices by sending commands on the serial bus. These aspects of the invention can be employed for example in a server system to optimize environmental monitoring.

In accordance with another aspect of the invention, a plurality of control devices arbitrate to determine which of a plurality of control devices shall be the master device for controlling a plurality of serial buses. The master device periodically switches between the plurality of serial buses to communicate with the slave devices. More particularly, the master device polls the slave devices and tracks responses to the polls received from the slave devices. After the master device has switched from a first of the plurality of serial buses to a second of the plurality of serial buses, then if a slave device responds to a poll on the second of the plurality of serial buses, and the slave device did not respond to a poll on the first of the plurality of serial buses as evidenced by the tracked responses, the master device ceases switching to the first of the plurality of serial buses. Furthermore, the master device periodically tests the first of the plurality of serial buses. The master device resumes switching to the first of the plurality of serial buses if the first of the plurality of serial buses is ascertained to be functional. A control device arbitrates to become the master device if the control device receives a command from a processor which is fullfillable by accessing a slave device via a serial bus. According to an implementation, a slave control device arbitrates to become the master device by responding to a poll from the control device that is currently the master device. The response to the poll includes information indicating that the slave control device is requesting to become the master device. The slave control device then becomes the master device if it receives an acknowledgement from the current master device.

In accordance with a further aspect of the invention, a control station monitors activity on the serial buses. Each control station is associated with a different timeout parameter. For each control station, if no activity is detected on the serial buses, the control station waits for a time period associated with the timeout parameter, and if, upon expiry of the time period, there is still no activity detected on the serial buses, the control station becomes the master station.

The various aspects of the invention can be employed for example in a multi-server computing system an efficient and highly available environmental monitoring system.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
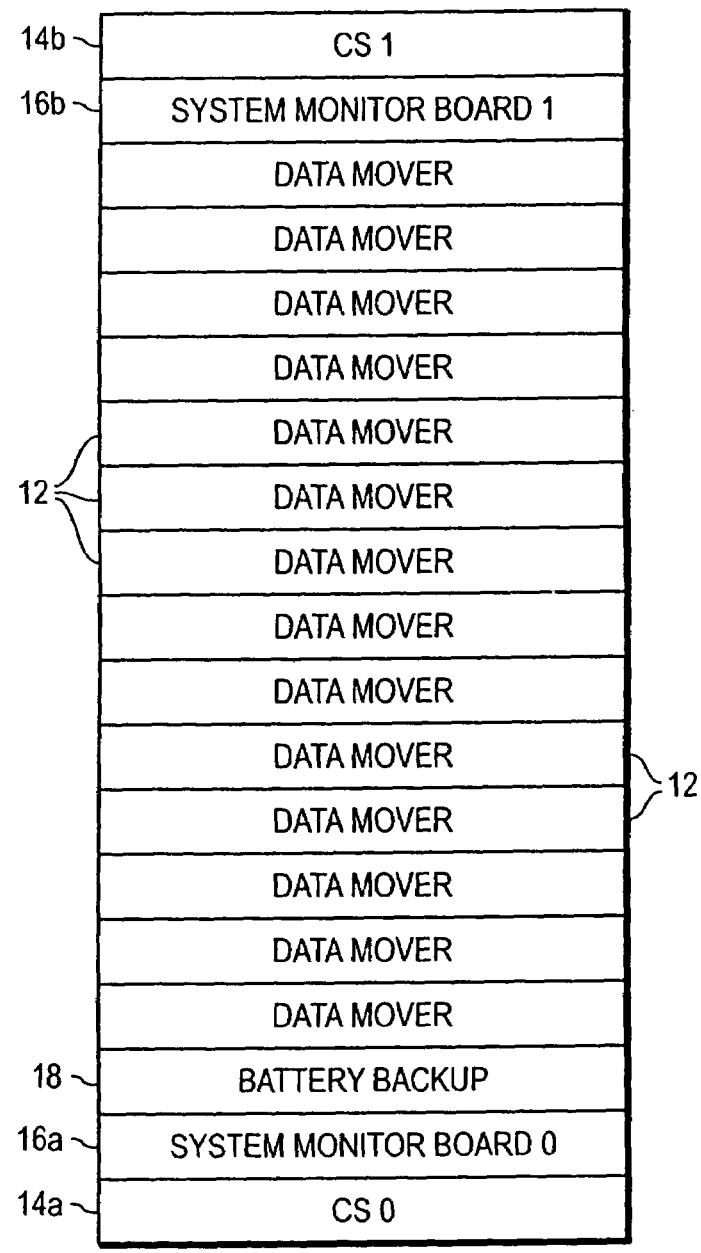
FIG. 1 is a representation of a rack mount server computing system.

Referring to FIG. 1, there is shown an example of a rack mount server system 10 in which the invention may be employed. The server system 10 herein shown includes 14 data movers 12, though more or fewer data movers can be included without departing from the principles of the invention. The server system 10 further includes a pair of control stations 14a and 14b, labeled CS0 and CS1 respectively. Also included is a pair of system monitor boards 16a and 16b, and a battery back up board 18.

Each data mover 12 is an independent server, which may be embodied as, for example, a Pentium motherboard and various peripherals. Each control station 14a,b controls, amongst other things, an environmental subsystem. The environmental subsystem monitors and manages the system environment. For example, the environmental subsystem consists of hardware and firmware that provides uninterrupted power to the system components—e.g. the data movers and system monitor boards—and monitors the integrity of the power and the various system components. The control stations 14a,b are redundant to provide high availability for the server system 10. The server system 10 is fully functional when only one control station 14a or b is installed. When both control stations 14a,b are installed, the system 10 continues to function despite the failure of one of the control stations 14a or b. The system monitor boards 16a,b are used for, amongst other things, monitoring the state of the system power supplies and monitoring the presence of data movers. The system monitor boards 16a,b are also redundant for high availability purposes. The battery backup board provides battery backup power in the event of a line power failure.

Figure 2:
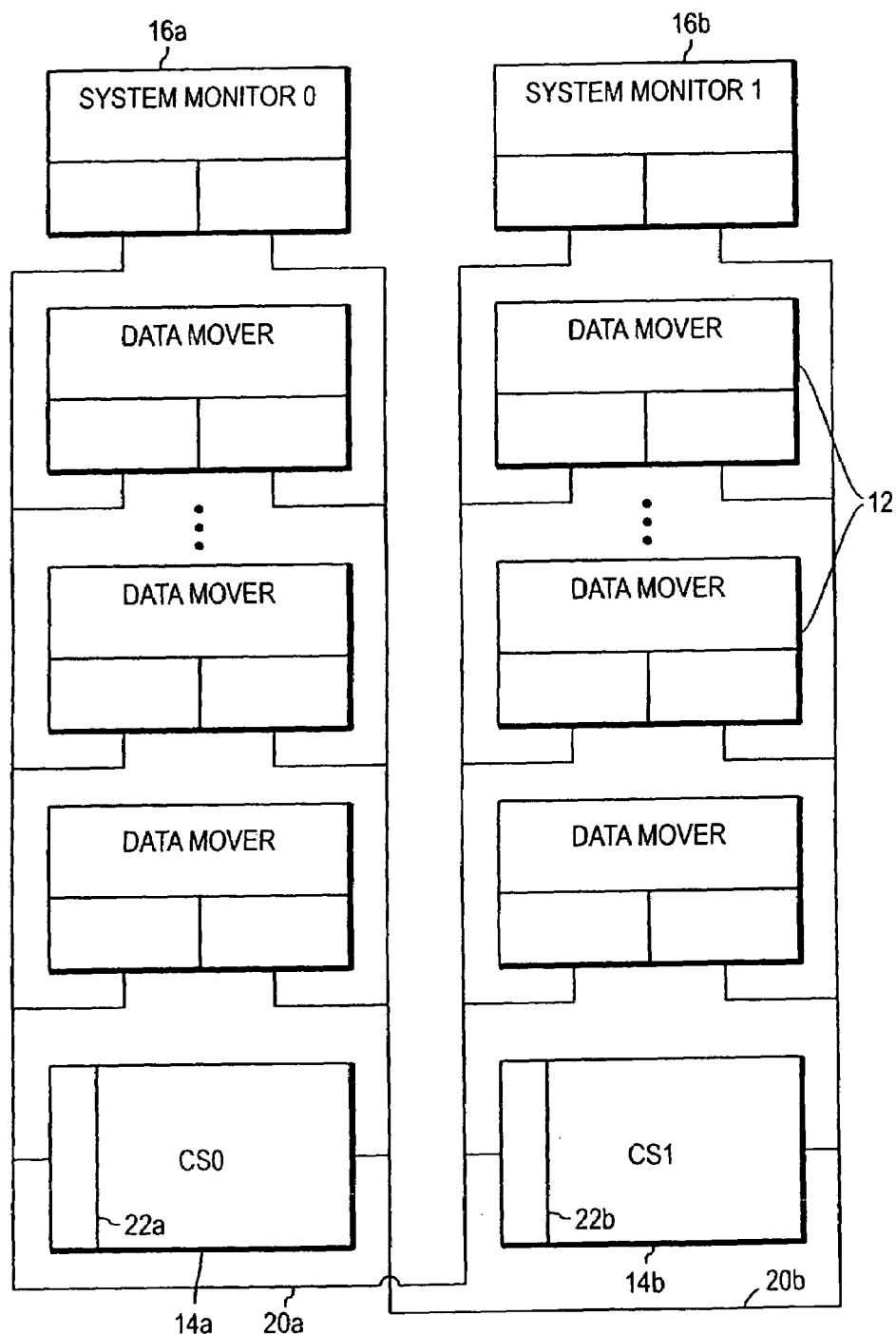
FIG. 2 is a block diagram representing the interconnection of the environmental subsystem.

Referring to FIG. 2, in accordance with the principles of the invention, communication within the environmental subsystem is built around a redundant pair of serial communication buses 20a,b. Any of a variety of serial buses can be used without departing from the invention, for example RS-232 (cite) or RS-485 (cite), or I2C (cite) serial buses. For simplicity, an RS-485 implementation is herein described. As shown, each RS-485 bus 20a,b is configured as a multi-drop master/slave asynchronous communication system. Each control station 14a,b includes a serial bus controller 22a,b respectively. At any given time, one of the serial bus controllers 22a,b acts as the bus "master", while all other devices coupled to the buses, including the other control station 14a,b and serial bus controller 22a,b act as bus "slaves". If only one control station, for example control station 14a is installed, then the serial bus controller 22a will always act as bus master. If both control stations 14a,b are installed, then either serial bus controller 22a,b can act as master. The master serial bus controller uses either serial bus 20a,b, but only one serial bus 20a,b at a time.

Figure 3:
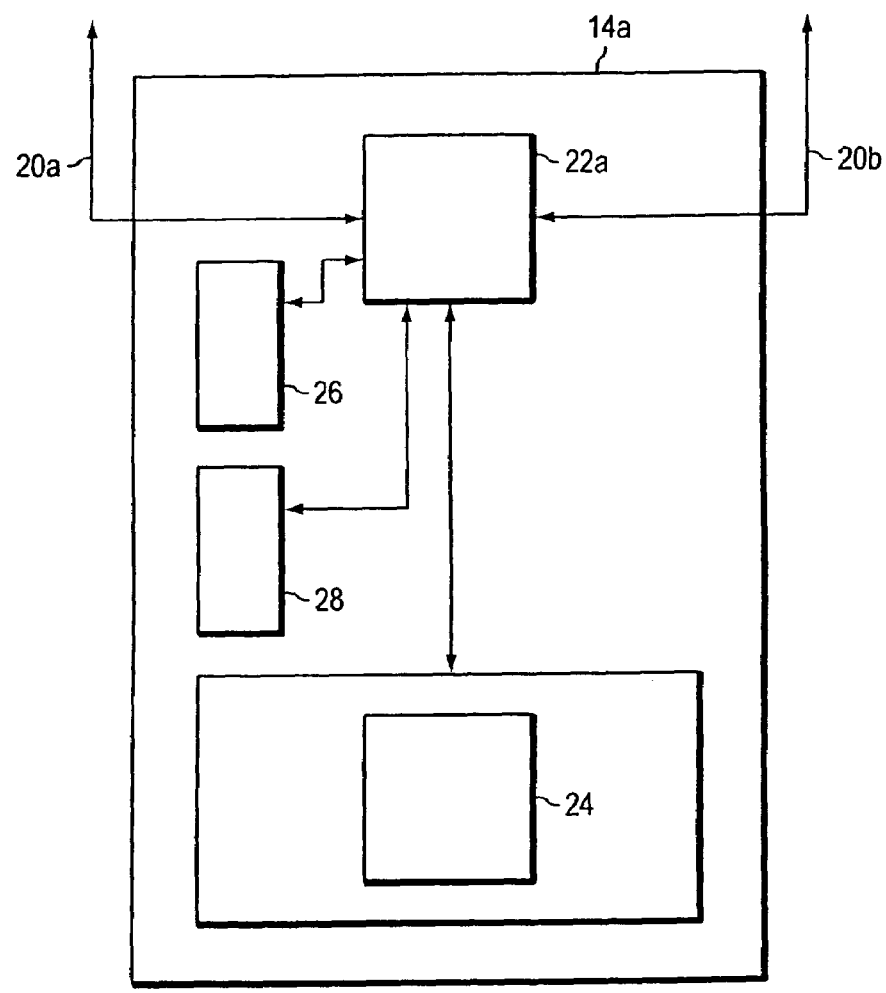
FIG. 3 is a block diagram of a control station.

In accordance with one aspect of the invention, the master serial bus controller 22a or 22b polls each device; e.g. data movers, system monitor boards, etc. connected to the serial bus 20a or 20b in use. Referring to FIG. 3, a master control station, for example control station 14a, is shown in more detail. The serial bus controller 22a is coupled to a processor 24 and the serial buses 20a and 20b. The serial bus controller 22a is further coupled to two polling lists—a fast polling list 26 and a slow polling list 28. Initially, all devices potentially present in the system are polled. After each poll, the master control station 14a waits a period of time, for example 30 ms, for a response. If no response is received within that time, the master control station 14a adds the device to the slow polling list 28. If a response is received, the master control station 14a adds the component to the fast polling list 26. The master control station 14a communicates regularly with the device on the fast polling list, and less frequently with the devices on the slow polling list. In a preferred implementation the serial bus controller 20a polls the fast polling list 26 and slow polling list 28, though it is understood that intervening devices could perform the polling and send the information to the serial bus controller 20a.

Figure 4A:
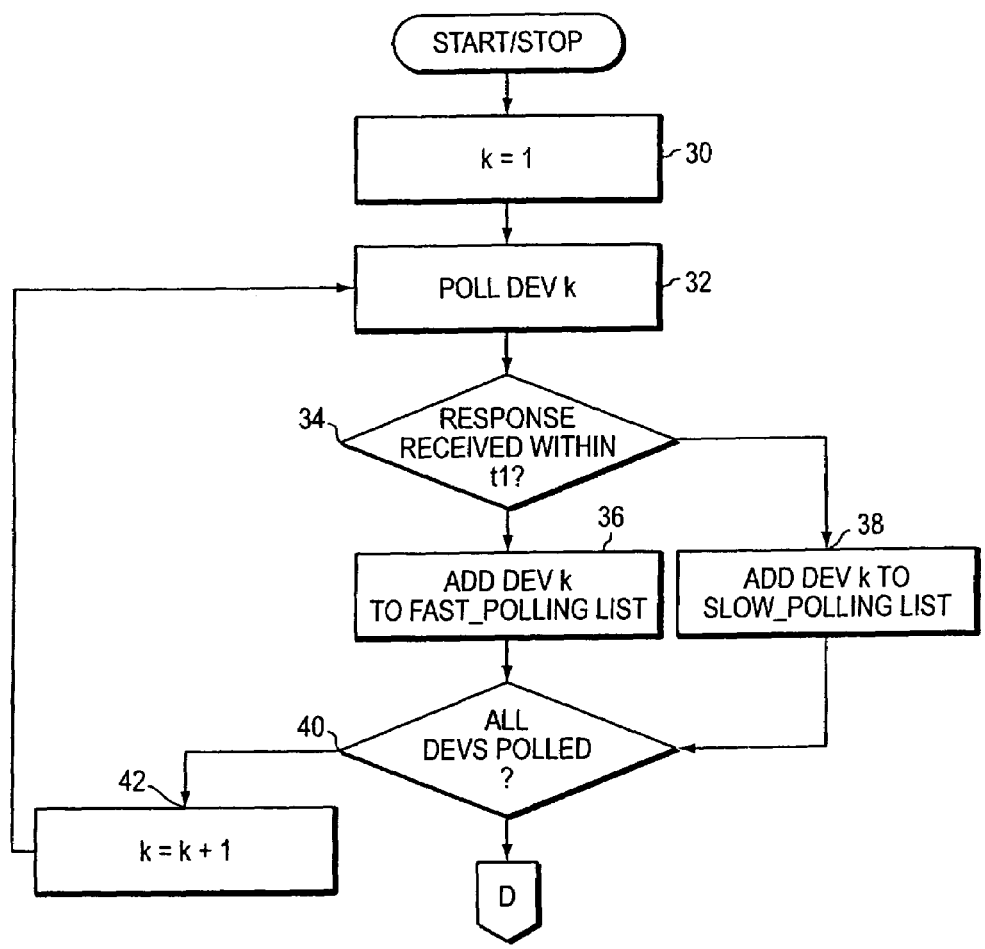
FIG. 4 is a flow diagram showing the process by which slave devices are polled by a master control station.
Figure 4B:
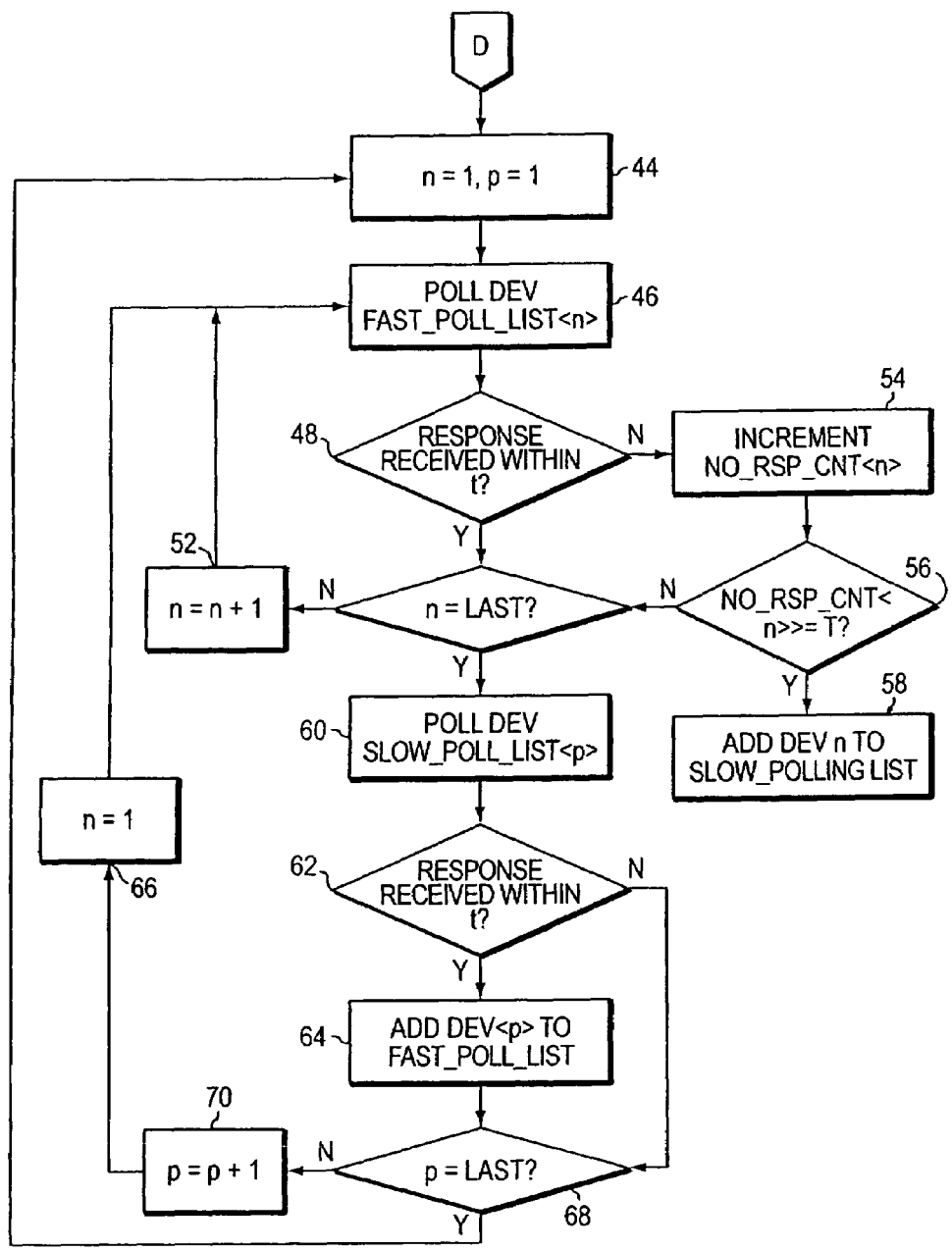

More particularly, referring to FIG. 4, the master control station 14a initially builds the fast and slow polling lists. The master control station 14a starts at the beginning of a list of devices and polls the first device (steps 30, 32). If a response is received from the polled device within a certain time t1 (step 34), the device is added to the fast polling list 26 (step 36). If no response is received within the time t1, the device is added to the slow polling list 28 (step 38). The master control station 14a then polls the next device in the list (steps 40, 42) until the list has been traversed.

Alternatively, the master control station 14a could build default fast and slow polling lists, such that the fast polling list 26 is initially populated with four devices for example, and slow polling list is populated with the rest of the devices. In either case, operation would proceed as follows.

Once the fast and slow polling lists 26 and 28 have been initialized, the master control station 14a continues to poll the devices and update the lists. Starting at the top of the lists (step 44), the master control station 14a begins polling the fast polling list 26 (step 46.) If a response is received from the polled device within a time t (step 48), and the end of the fast polling list has not been reached (step 50), the next device in the fast polling list is polled (steps 52, 46). If no response is received from the polled device (step 48), a no-response counter associated with the polled device is incremented (step 54) and the next device is polled (steps 50, 52, 46). If, after a series of polls, the device continues to fail to respond, and the no-response counter indicates that the device has not responded for a time T or more (step 56), for example 6 seconds, then the device is removed from the fast polling list 26 and added to the slow polling list 28 (step 58). Polling of the fast polling list continues until the end of the list is reached (step 50). At this point, the first device on the slow polling list is polled (step 60.) If the device responds within a time t (step 62), the device is removed from the slow polling list 28 and added to the fast polling list 26 (step 64) and the master control station 14a resumes polling from the top of the fast polling list 26 (steps 66, 46). Otherwise, if there is no response from the device within time t (step 62), then the master control station 14a leaves the device on the slow polling list 28, and checks to see if the slow polling list has been traversed (step 68). If not, the master control station 14a increments the slow polling list pointer (step 70) and resumes polling from the top of the fast polling list (steps 66, 46). If so, the process resumes from the start (step 44).

In accordance with another aspect of the invention, each master control station 14a, b, when it is a bus master, has available for use two serial buses 20a and 20b. If one serial bus, for instance serial bus 20a, fails, the other serial bus 20b can be used by the master control station, and thus high availability of the environmental subsystem is achieved. The master control station 14a or 14b is able to test both the serial buses 20a and 20b for full functionality by switching back and forth between them once every pre-determined interval—for example, 700 ms or 1s. If a slave device responds to a poll on one serial bus 22a,b, but not the other, the master control station fails over to the responding bus, and ceases trying to communicate on the failed bus. The master control station then checks the failed bus periodically, for example once per minute by polling the device that was not responding on the failed bus. If a response is received, the master control station will resume the alternating use of the two buses. High availability of the environmental subsystem is thereby achieved.

Figure 5A:
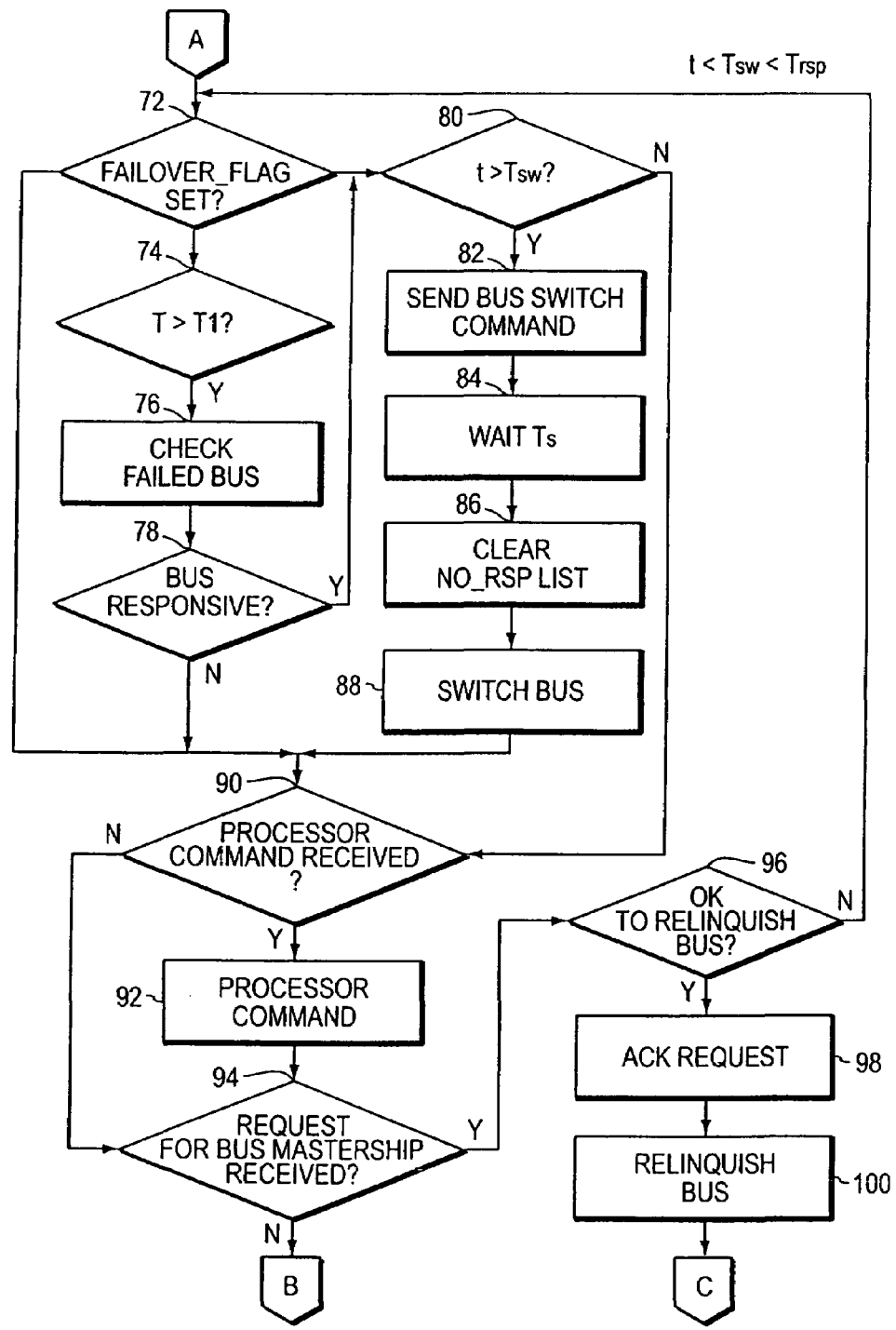
FIG. 5 is flow diagram showing the process by which a master control station switches between serial buses while polling devices.
Figure 5B:
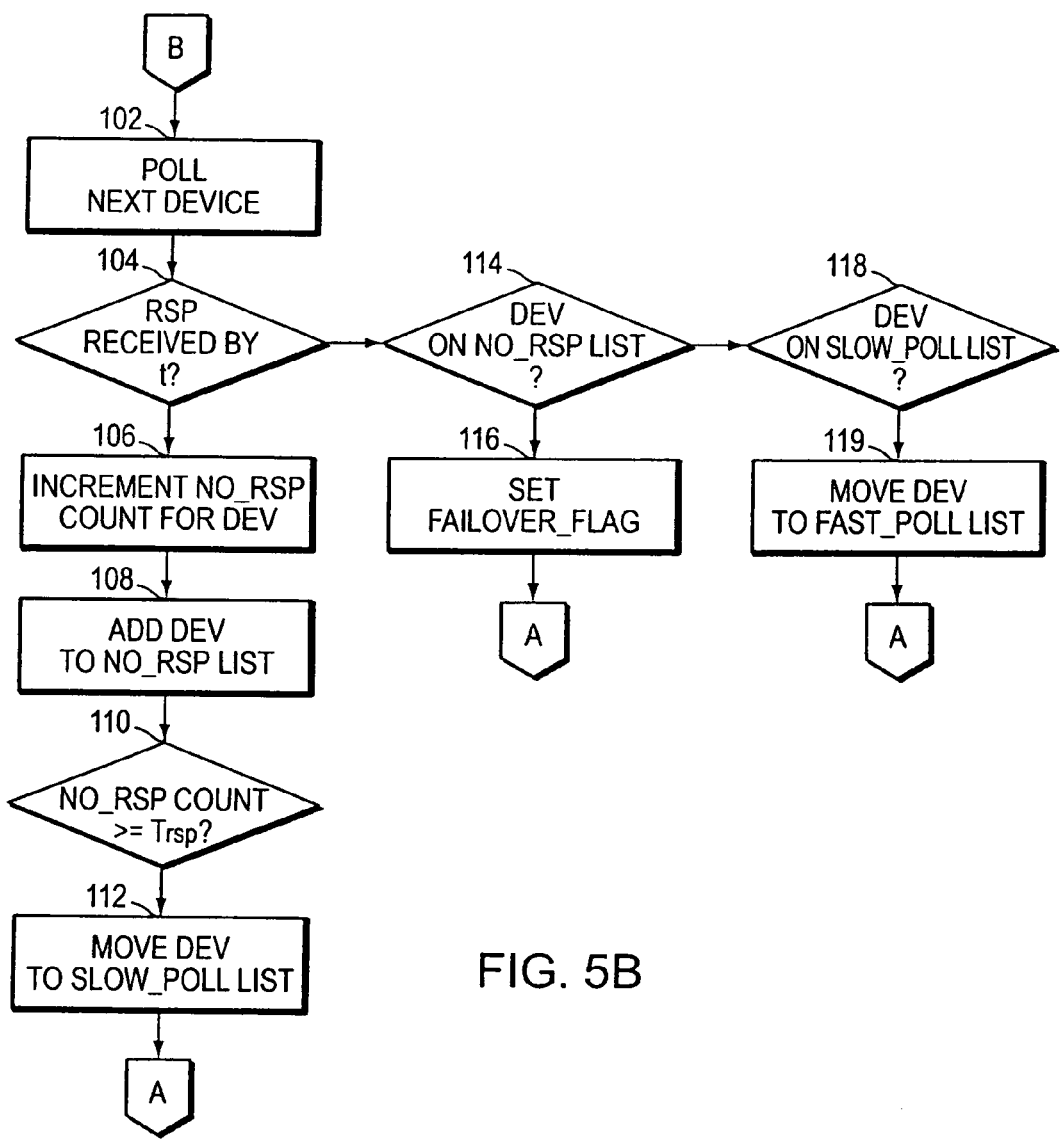

More particularly, referring to FIG. 5, there is shown the operation of the master control station, for example master control station 14a. The master control station 14a first checks a Failover_flag to ascertain whether it is set (step 72). If the Failover flag is set, this indicates that one of the serial buses 20a,b has failed. The failure may have occurred because the bus in non-responsive or because a device that is responsive on one bus is non-responsive on the other, as to be further described. The failed bus should not be used until it becomes functional. The failed bus is checked periodically (steps 74, 76) to see if it has become responsive (step 78.) If the failed bus has become responsive, the control station will resume switching between buses periodically, for example every 700 ms or every second. If the failed bus has not become responsive, the master control station 14a does not switch between buses and uses only the operational bus.

If the Failover_flag is not set, then the master control station 14a checks to see if it is time to switch between the serial buses (step 80). If not, the master control station 14a continues normal operations on the bus it is currently using, for example serial bus 20a. If a period of time has passed that indicates a bus switch should occur (step 80) then the master control station 14a sends a command to all slave devices indicating that the slave devices should continue communications on the other serial bus 20b (step 82). The master control station 14a waits a certain time period Ts (step 84) to ensure all devices have switched buses. The master control station 14a then clears a no-response list (step 86), and resumes operations on the other serial bus 20b (step 88).

The master control station 14a checks to see if a processor command has been received from the processor 24 (step 90). If it has, the processor command is processed as required, which may involve communications with other devices in the system (step 92). The control station also checks to see if the other (slave) control station 14b in the system has requested bus mastership (step 94). If such a request has been received, then the master control station 14a checks to see whether it is in a position to relinquish control of the serial buses 20a,b (step 96). There are several circumstances wherein control of the bus should not be relinquished. For example, the master control station 14a may be in the process of a software download, or it may have received a "bus lock" command from the processor 24. If the master control station 14a ascertains that the bus can be relinquished, the master control station 14a acknowledges the request by sending an acknowledgement message back to the requesting control station 14b (step 98) and relinquishes the bus (step 100). The control station 14a then enters slave mode, to be further described.

If no request for bus mastership is outstanding (step 94), then the master control station 14a resumes polling devices, for example in the manner described in FIG. 4. The master control station 14a polls the next device (step 102) and waits a certain time t for a response. If no response is received for the device (step 104), the no-response counter for the device is incremented as previously described (step 106). In addition, the device is added to a no-response list (step 108). If the no-response counter indicates that the device should be moved to the slow polling list (step 110), the device is so moved, as previously described (step 112). If a response is received from the device, then the no-response list for the device is checked (step 114). If the no response list indicates that the device previously failed to respond to a poll, this means that the device was responsive on the bus not currently in use but is responsive on the bus currently in use. The Failover_flag is therefore set (step 116), and the master control station 14a returns to step 72 and does not switch back to the other bus until it becomes responsive (steps 72–78). If the device responds and the no response list does not include the device, this indicates that the device was responsive on the other bus (step 114). Then, if the device is on the slow polling list (step 118), it is moved to the fast polling list (step 119.) The master control station 14a returns to step 72 to resume normal operation including switching between buses.

Figure 6:
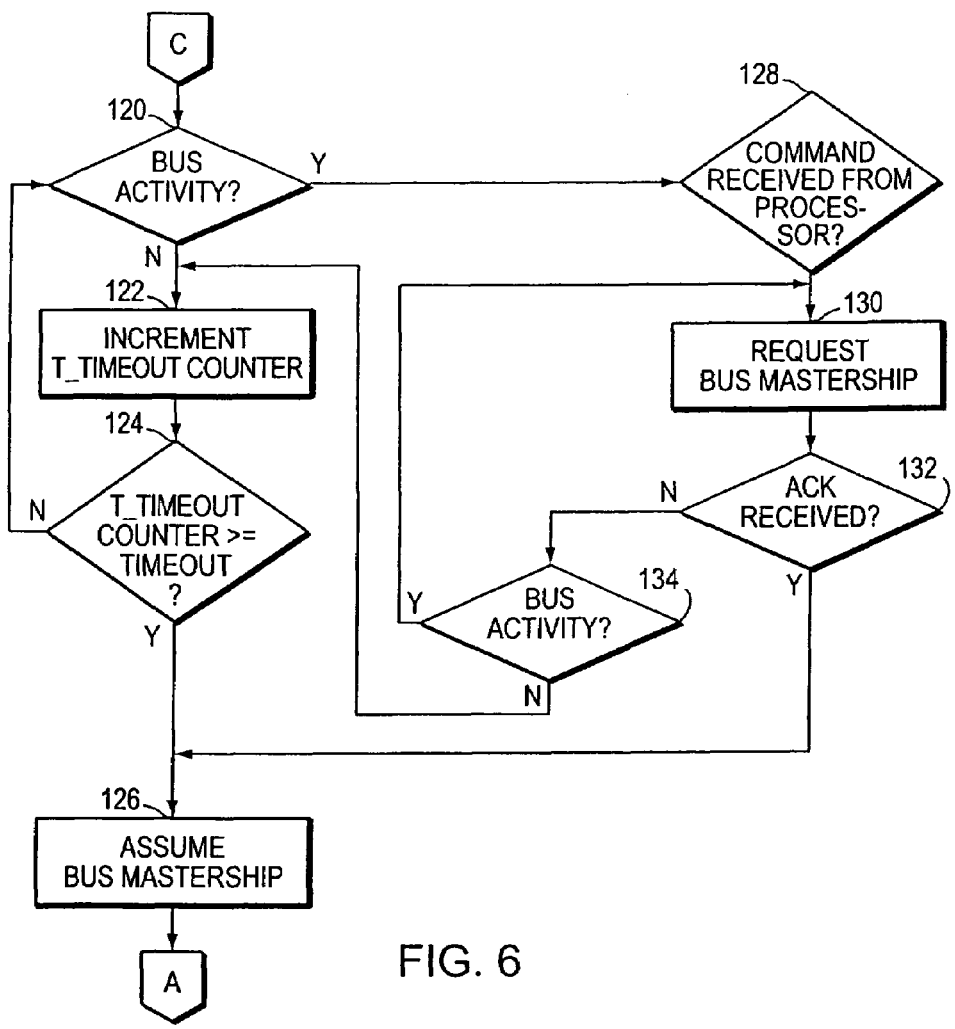
FIG. 6 is a flow diagram showing the process followed by a slave control station.

When the master control station 14a relinquishes control of the serial buses 20a,b (step 100), it enters slave mode and becomes the slave control station 14a, while the other control station 14b becomes the master control station 14b. Referring to FIG. 6, there is shown the process by which the control station 14a operates in slave mode. The slave control station 14a monitors the serial buses 20a,b to ascertain whether one of the buses shows bus activity (step 120). If no bus activity is detected, a timeout counter is incremented (step 122), If the timeout counter exceeds a certain amount of time (step 124), the slave control station 14a assumes bus mastership and becomes the master control station 14a (step 126).

In accordance with an aspect of the invention, the amount of time that the timeout counter must exceed in order for a control station to assume bus mastership differs for each control station. According to one embodiment, the timeout value depends upon the system slot address of the control station. The control station 14a,b with the lower slot address times out first and thus assumes control of the serial buses 20a,b first. Upon power up or system reset, both control stations 14a, b initialize as slaves. The first to time out, in other words the control station with the lower slot address, will assume bus mastership. The other control station will detect bus activity before it times out (step 120) and will remain in slave mode.

When in slave mode, the slave control station 14a waits for commands from the processor 24. If a command is received that requires serial bus access (step 128), then the slave control station 14a requests bus mastership (step 130). If an acknowledgement is received (step 132), the slave control station 14a assumes bus mastership (step 126) and proceeds as shown in FIG. 5. If an acknowledgement is not received, this may be because the master control station 14b is not in a position to relinquish bus control, or it may be because the bus has failed. So, if no acknowledgement is received (step 132), the slave control station 14a monitors bus activity (step 134). If there is bus activity, the slave control station continues to request bus mastership until an acknowledgement is received (steps 128–132). If there is no bus activity, then the slave control station 14a waits its timeout period and assumes bus mastership if the timeout period expires (steps 120–126).

According to one implementation of the invention, the master control station communicates with the slave devices by sending and receiving packets over the serial buses.

Figure 7:
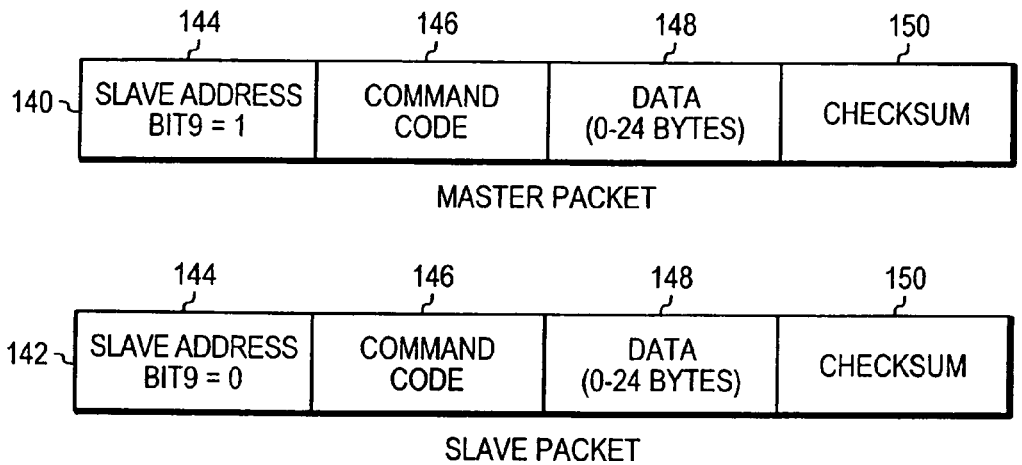
FIG. 7 is a representation of a master packet and a slave packet.
Figure 8:
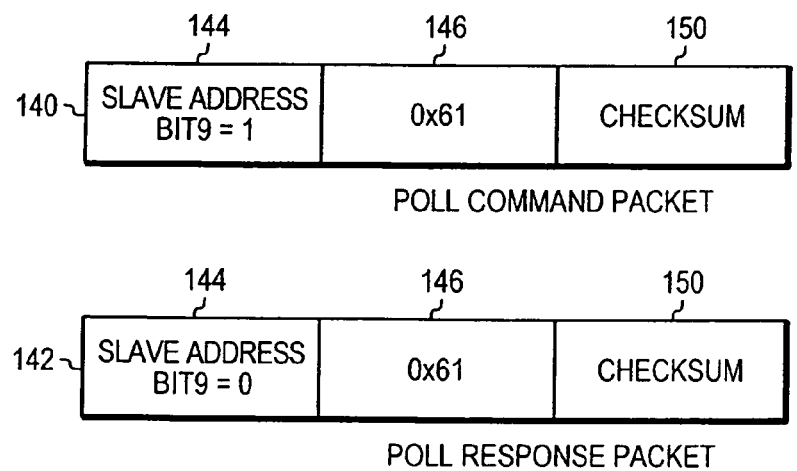
FIG. 8 is a representation of a poll command and a poll response.

There are many known serial bus packet protocols. One such protocol is a 9-bit protocol, wherein a byte is led or followed by a $9^{th}$ bit that is used to distinguish between address and data bytes. Referring to FIG. 7, two types of packets are shown—a master packet 140 and a slave packet 142. In the master packet, the slave address field 144 specifies the destination device for the packet. The $9^{th}$ bit in the slave address field is asserted. The command code field 146 specifies one of a variety of either write or read commands. Depending on the command, the packet can carry 0 to n bytes of data 148 as its payload, where n may be any number convenient for particular design rules. A checksum 150 is provided for error detection purposes. The Slave packet follows essentially the same format, but without the $9^{th}$ bit set. As previously described with reference to FIG. 4, the master control station periodically polls all slave stations. As shown in FIG. 8, a particular command code herein designated '0x61' indicates a poll command. The poll command is sent to each device on the fast polling list 26, and then to each device on the slow polling list 28. Slaves respond with the same command code and 0 data bytes.

Figure 9:
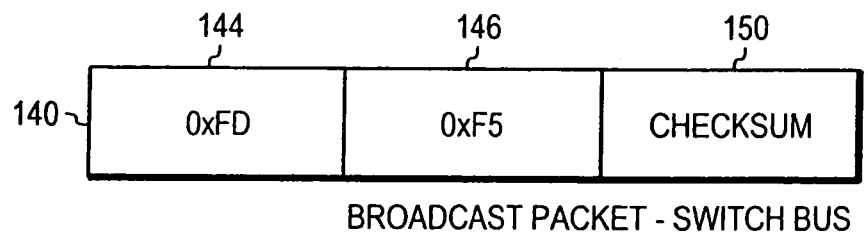
FIG. 9 is a representation of a broadcast packet.

Also, referring to FIG. 5, the master control station periodically sends a command that causes all slave devices to switch serial buses (step 82). Specifically, referring to FIG. 9, the master control station sends a special type of packet, herein called a broadcast packet, to all slaves at once. The address field of the broadcast packet is herein designated '0xFD'. When a slave device recognizes this address with the $9^{th}$ bit set, the slave device realizes the packet is destined for itself. A command code of '0xF5' indicates that the slave device should switch from the primary bus to the secondary bus.

Figure 10:
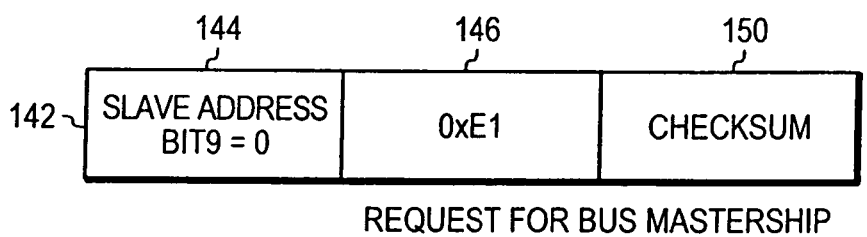
FIG. 10 is a representation of a poll response that functions as a bus master request packet, and a acknowledge packet.
Figure 10:
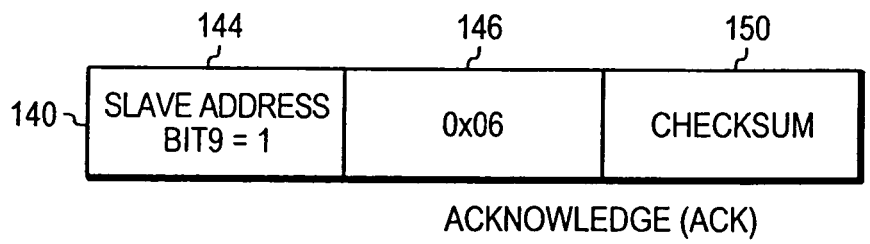

Also, with reference to FIG. 5, a slave control station can request to become the master control station (step 130). To do so, the slave control station responds to a poll command from the master control station with the command code set to "0xE1" as shown in FIG. 10. When the master control device receives such a response to a poll command, then if the master control device is in a position to relinquish control of the serial buses, it sends an ACK response to the slave control station. The ACK response, as shown in FIG. 10, is a packet with a command code of 0x06. The slave control station, upon receipt of the ACK packet, then assumes bus mastership.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes. For example, the present invention can be implemented in hardware, for example in ASIC or PLD devices. Or, the invention can be implemented in software run by a controller or microprocessor. Furthermore, though the invention has been described in terms of a computing system, it is clear that the invention can be employed in any type of system wherein a highly available serial bus architecture would be useful—for example, storage or networking systems.

We claim:

1. Apparatus comprising:
   a master device for polling a plurality of slave devices and maintaining a fast polling list and a slow polling list, the master device polling only one slave device at a time from either list,
   wherein each slave device is associated with either the fast polling list or the slow polling list, and wherein the fast polling list is polled by the master device more frequently than the slow polling list, and
   wherein a slave device is associated with the fast polling list if the slave device responds to a poll from the master device within a time period, and wherein the slave device is associated with the slow polling list if the slave device does not respond to the poll from the master device within the time period.

2. The apparatus of claim 1 wherein a slave device on the slow polling list is unassociated with the slow polling list and associated with the fast polling list if the slave device responds to a poll from the master device within the time period.

3. The apparatus of claim 2 wherein a slave device on the slow polling list is polled by the master device after all slave devices on the fast polling list have been polled.

4. The apparatus of claim 3 wherein the master device and the slave devices are coupled to a serial bus, and wherein the master device polls the slave devices by sending commands on the serial bus.

5. Apparatus comprising:
   a plurality of slave devices;
   a plurality of control devices that are capable of being master devices;
   a plurality of serial buses to which the control devices and slave devices are coupled;
   wherein the plurality of control devices arbitrate to determine which of the plurality of control devices shall be the master device for controlling the plurality of serial buses; and
   wherein the master device periodically switches between the plurality of serial buses to communicate with the slave devices;
   wherein the master device polls the slave devices and tracks responses to the polls received from the slave devices, and wherein, after the master device has switched from a first of the plurality of serial buses to a second of the plurality of serial buses,
   if the master device receives a response from a slave device to a poll on the second of the plurality of serial buses, and the master device did not receive a response from the slave device to a poll on the first of the plurality of serial buses as evidenced by the tracked responses, the master device ceases switching to the first of the plurality of serial buses.

6. The apparatus of claim 5 wherein the master device periodically tests the first of the plurality of serial buses, and wherein the master device resumes switching to the first of the plurality of serial buses if the first of the plurality of serial buses is ascertained to be functional.

7. The apparatus of claim 5 wherein each control device is coupled to a processor, and wherein a control device arbitrates to become the master device if the control device received a command from the processor which is fullfillable by accessing a slave device via a serial bus.

8. The apparatus of claim 5 wherein each control station monitors activity on the plurality of serial buses, and wherein each control station is associated with a different timeout parameter, and wherein, for each control station, if no activity is detected on the plurality of serial buses, the control station waits for a time period associated with the timeout parameter, and if, upon expiry of the time period, there is still no activity detected on the plurality of serial buses, the control station becomes the master station.

9. The apparatus of claim 7 wherein a slave control device arbitrates to become the master device by responding to a poll from the control device that is currently the master device, wherein the response to the poll includes information indicating that the slave control device is requesting to become the master device.

10. The apparatus of claim 9 wherein the slave control device becomes the master device if it receives an acknowledgement from the current master device.

11. A method comprising the steps of:
polling by a master device a plurality of slave devices;
maintaining by the master device a fast polling list and a slow polling list, the master device polling only one slave device at a time from either list;
associating by the master device each slave device with either the fast polling list or the slow polling list, wherein the fast polling list is polled by the master device more frequently than the slow polling list, and
associating by the master device a slave device with the fast polling list if the slave device responds to a poll from the master device within a time period, and associating by the master device the slave device with the slow polling list if the slave device does not respond to the poll from the master device within the time period.

12. The method of claim 11 further comprising the step of:
unassociating by the master device a slave device on the slow polling list and associating by the master device the slave device with the fast polling list if the slave device responds to a poll from the master device within the time period.

13. The method of claim 12 further including the step of:
polling by the master device a slave device on the slow polling list after all slave devices on the fast polling list have been polled.

14. The method of claim 13 wherein the step of polling by a master device a plurality of slave devices comprises sending commands on a serial bus.

15. A method comprising the steps of:
arbitrating by a plurality of control devices to determine which of the plurality of control devices shall be a master device for controlling a plurality of serial buses;
periodically switching by the master device between the plurality of serial buses to communicate with the slave devices;
polling by the master device the slave devices;
tracking by the master device responses to the polls received from the slave devices;
and wherein, after the master device has switched from a first of the plurality of serial buses to a second of the plurality of serial buses, if the master device receives a response from a slave device to a poll on the second of the plurality of serial buses, and the master device did not received a response from the slave device to a poll on the first of the plurality of serial buses as evidenced by the tracked responses,
ceasing by the master device switching to the first of the plurality of serial buses.

16. The method of claim 15 further comprising the steps of:
periodically testing by the master device the first of the plurality of serial buses;
resuming switching by the master device to the first of the plurality of serial buses if the first of the plurality of serial buses is ascertained to be functional.

17. A method comprising the steps of:
arbitrating by a plurality of control devices to determine which of the plurality of control devices shall be a master device for controlling a plurality of serial buses;
periodically switching by the master device between the plurality of serial buses to communicate with the slave devices; wherein the step of arbitrating comprises the steps of:
receiving by a control device a command from a processor;
requesting by the control device to become the master device if the command received from the processor is fullfillable by accessing a slave device via a serial bus.

18. The method of claim 17 wherein a slave control device requests to become the master device by responding to a poll from the control device that is currently the master device, wherein the response to the poll includes information indicating that the slave control device is requesting to become the master device.

19. The method of claim 17 further comprising the steps of:
monitoring by each control station activity on the plurality of serial buses, and wherein each control station is associated with a different timeout parameter, and wherein, for each control station,
detecting activity on the plurality of serial buses;
if no activity is detected on the plurality of serial buses, waiting for a time period associated with the timeout parameter, and if, upon expiry of the time period, there is still no activity detected on the plurality of serial buses, becoming the master station.

20. The method of claim 18 further comprising the step of:
the slave control device becoming the master device if the slave control device receives an acknowledgement from the control device that is currently the master device.

21. A program product comprising a computer readable medium having embodied therein a computer program for storing data, the computer program comprising:
logic for polling by a master device a plurality of slave devices;
logic for maintaining by the master device a fast polling list and a slow polling list, the logic for polling only one slave device at a time from either list;
logic for associating by the master device each slave device with either the fast polling list or the slow polling list, wherein the fast polling list is polled by the master device more frequently than the slow polling list, and
logic for associating by the master device a slave device with the fast polling list if the slave device responds to a poll from the master device within a time period, and associating by the master device the slave device with the slow polling list if the slave device does not respond to the poll from the master device within the time period.

22. The program product of claim 21 further comprising:
logic for unassociating by the master device a slave device on the slow polling list and associating by the master device the slave device with the fast polling list if the slave device responds to a poll from the master device within the time period.

23. The program product of claim 22 further comprising:
logic for polling by the master device a slave device on the slow polling list after all slave devices on the fast polling list have been polled.

24. The program product of claim 23 wherein the logic for polling by a master device a plurality of slave devices comprises sending commands on a serial bus.

25. A program product comprising a computer readable medium having embodied therein a computer program for storing data, the computer program comprising:
logic for arbitrating by a Plurality of control devices to determine which of the plurality of control devices shall be a master device for controlling a plurality of serial buses;
logic for periodically switching by the master device between the plurality of serial buses to communicate with the slave devices;
logic for polling by the master device the slave devices;
logic for tracking by the master device responses to the polls received from the slave devices;
logic operable after the master device has switched from a first of the plurality of serial buses to a second of the plurality of serial buses for causing the master device to cease switching to the first of the plurality of serial buses, if the master device receives a response from a slave device to a poll on the second of the plurality of serial buses, and the master device did not receive a response from the slave device to a poll on the first of the plurality of serial buses as evidenced by the tracked responses.

26. The program product of claim 25 further comprising:
logic for periodically testing by the master device the first of the plurality of serial buses;
logic for resuming switching by the master device to the first of the plurality of serial buses if the first of the plurality of serial buses is ascertained to be functional.

27. A program product comprising a computer readable medium having embodied therein a computer program for storing data, the computer program comprising:
logic for arbitrating by a plurality of control devices to determine which of the plurality of control devices shall be a master device for controlling a plurality of serial buses;
logic for periodically switching by the master device between the plurality of serial buses to communicate with the slave devices; wherein logic for arbitrating comprises:
logic for receiving by a control device a command from a processor;
logic for requesting by the control device to become the master device if the command received from the processor is fullfillable by accessing a slave device via a serial bus.

28. The program product of claim 27 wherein the logic for requesting includes logic for responding to a poll from the control device that is currently the master device, wherein the response to the poll includes information indicating that the slave control device is requesting to become the master device.

29. The program product of claim 27 further comprising:
logic for monitoring by each control station activity on the plurality of serial buses, and wherein each control station is associated with a different timeout parameter, and wherein, for each control station;
logic for detecting activity on the plurality of serial buses;
logic functional such that, if no activity is detected on the plurality of serial buses, waiting for a time period associated with the timeout parameter, and if, upon expiry of the time period, there is still no activity detected on the plurality of serial buses, becoming the master station.

30. The program product of claim 28 further comprising:
logic for causing the slave control device to become the master device if the slave control device receives an acknowledgement from the control device that is currently the master device.

* * * * *